UNITED STATES PATENT OFFICE.

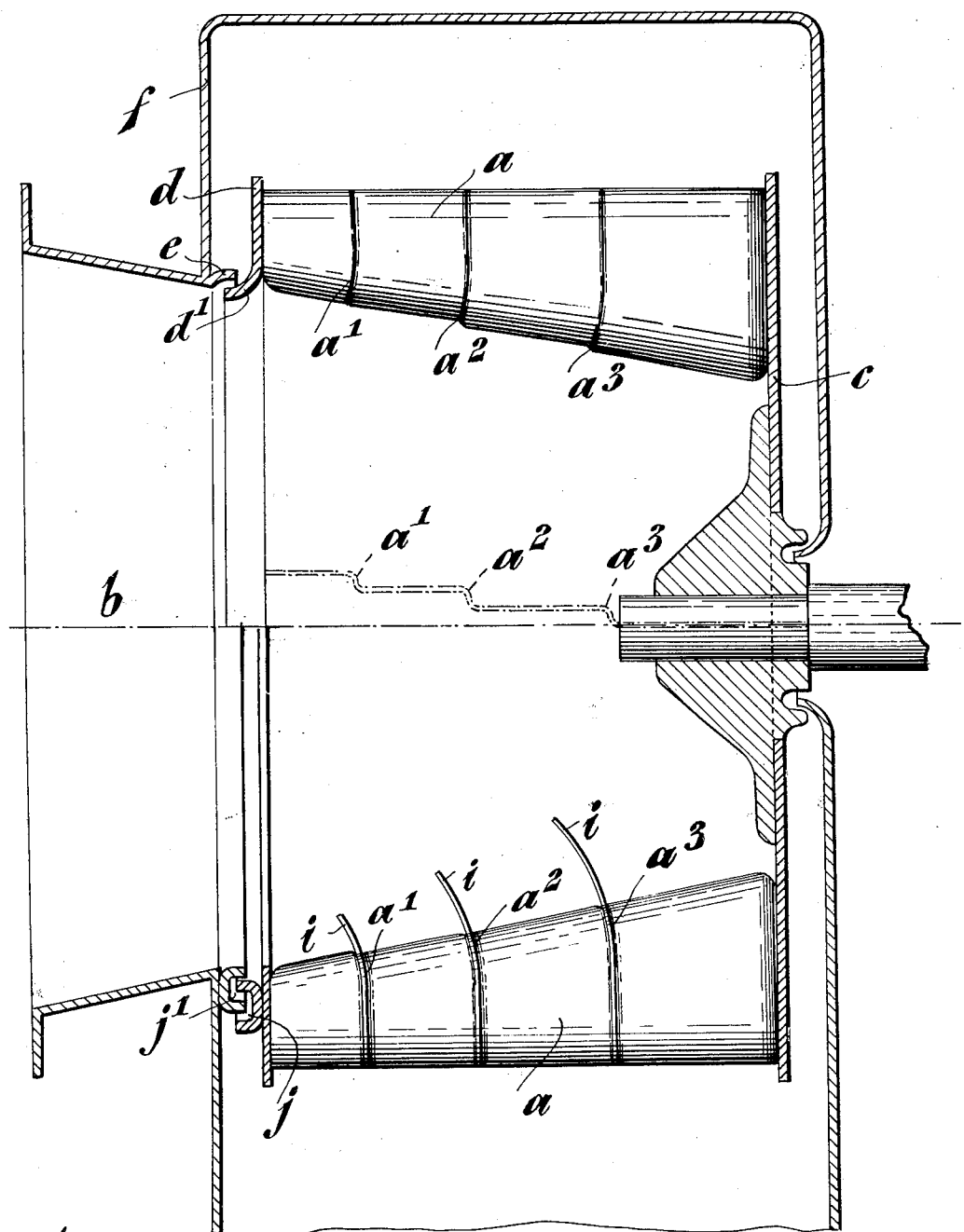

OLAF BERG JACOBSEN, OF BIRMINGHAM, ENGLAND.

CENTRIFUGAL FAN, PUMP, OR THE LIKE.

1,058,592. Specification of Letters Patent. Patented Apr. 8, 1913.

Application filed June 3, 1912. Serial No. 701,392.

*To all whom it may concern:*

Be it known that I, OLAF BERG JACOBSEN, a subject of the Kingdom of Great Britain, residing at 24 Cecil road, Erdington, Birmingham, in the county of Warwick, England, have invented certain new and useful Centrifugal Fans, Pumps, or the Like, of which the following is a specification.

This invention comprises certain improvements in or relating to centrifugal fans, pumps, or like appliances for exhausting or compressing, or for generally operating upon or imparting motion to fluids, and is applicable to the class of centrifugal fan, exhauster, pump or the like in which the air, gas or fluid axially enters the rotor chamber and tangentially egresses from same. Such a fan or the like conveniently has the rotor contained within a more or less scroll-shaped chamber having an axially disposed suction eye, and the air or fluid enters the interior of the rotor, passes out between the fan blades or vanes and ultimately leaves the rotor chamber by the tangential means of egress. In investigating the passage of the fluid successively through the suction eye and the rotor, it has been ascertained that a larger quantity of fluid passes around the wall of the suction eye than flows through the central portion of same, and it has furthermore been ascertained that a substantial or abnormal quantity of fluid passing in at the suction eye is precipitated axially across the interior of the rotor and leaves the latter on the side thereof remote from the suction eye, the result of which is that an abnormal or increased quantity of the fluid is leaving the rotor on the side thereof remote from the suction eye, whereas that side of the rotor contiguous to the suction eye is not receiving or operating upon an appropriate amount of the fluid. Obviously such circumstances of uneven distribution of the fluid throughout the axial width of the rotor detract considerably from the general efficiency of the appliance.

The present invention has for its object to provide a particularly efficient and satisfactory method of evenly distributing the fluid throughout the entire axial width of the rotor so that the blades thereof receive substantially the same quantity of fluid throughout their length from side to side of the rotor chamber. And the said object is attained without complications and in an essentially practicable and simple manner.

The present invention is carried out by systematically baffling or impeding the progress of the fluid in its passage in a direction transversely of the rotor in such a manner that a larger quantity of the fluid is acted upon by the extremities of the blades nearest to the suction eye, and by the central parts of the blades than heretofore, the result thus being that a more even distribution of the outgoing fluid is obtained along the entire length of the blades from side to side of the rotor this resulting in a more even pressure or balance of the fluid both within the rotor chamber as well as outside of the blades, and counter or return currents detracting from the proper progress of the fluid are substantially avoided.

In order that this invention may be clearly understood and readily carried into practice, reference may be had to the appended explanatory sheet of drawings.

The means for baffling the fluid may be of many different forms. According to one convenient arrangement, as shown in the upper part of the figure the blades $a$ are bent or shaped to a stepped formation the longitudinal parts of the steps $a^1$, $a^2$, $a^3$ being advantageously disposed in a line parallel with the direction of flow of the fluid transversely across the rotor while the uprising parts of the steps $a^1$, $a^2$, $a^3$, are disposed at right angles in such a manner that the air tending to flow along the face of a blade $a$ from the end thereof nearest the suction eye $b$ to the other end thereof would first come into contact with the first step $a^1$ after mounting which it would then be progressively counteracted by a second $a^2$, third $a^3$, or any suitable number of steps the effect of which step or steps is to accumulatively counteract the flow of fluid longitudinally along the length of the blade from the suction eye extremity thereof to its other extremity and to cause the fluid to take the desired radial direction of flow with the object and advantages aforementioned.

That part of each step which is substantially in a plane at right angles to the axis of the rotor may in some cases be extended into the interior of the rotor in the form of or furnished with a tongue $i$ and when a series of two or more steps are employed in conjunction with each blade the tongues $i$ may project farther into the center of the rotor as the steps near the side thereof remote from the suction eye. Such an arrangement is shown in the lower part of the figure.

Where more than one step is provided in the length of the blade the steps may be of the same depth or they may increase or decrease in depth as they near the side of the rotor remote from the suction eye, or such steps may be arranged in any other suitable or convenient form. Where the uprising parts of the steps vary in depth the tongues $i$ if used, may correspondingly vary in width as well as in the degree to which they project into the interior of the rotor.

According to another arrangement shown in the lower part of the figure, the fan blades $a$ instead of being bent or formed to a stepped formation may be straight throughout their entire length but the tongue members $i$ aforedescribed projecting into the interior of the rotor may be used and may be provided upon or in connection with guide vanes disposed between the blades and in a plane substantially at right angles to the axis of the rotor; the said tongue members of a circle of guide vanes having intermediate spaces and said spaces may decrease as the circles of tongues near the side of the rotor remote from the suction eye $b$. In such last arrangement of the spaces the degree to which the tongue members $i$ project may be substantially the same throughout the width from side to side of the rotor.

The axial spaces between the guide vanes may increase from the suction eye side of the rotor to the opposite side thereof or such spaces may be equal and the tongue members may be straight from their outer to their inner edges or extremities or they may be bent or dished out in a direction toward the suction eye, in the various forms of the invention as shown in the drawing.

By the employment of one or more sets of tongue members whether in conjunction with the stepped formation or with the guide vanes, or alone or by the employment of other appropriate baffling means such as the one or more annuli or diaphragms, a substantial mass or quantity of the fluid instead of following an unobstructed passage to the far side of the rotor, is broken up; the first baffling means (where a plurality are used) offer an obstruction to the axially flowing fluid, collecting a part thereof and causing it to follow the desired radial course and as the obstructions increase, the main body of fluid is successively reduced in quantity.

The fan blades or vanes themselves may be straight or curved and disposed radially with the concave side in the direction of rotation or they may be fixed with a slight forward tilt or lead. Where curved blades are provided they are conveniently fixed with their inner and outer edges in one plane. The blades may be formed with their inner and outer edges lying in the peripheries of co-axial cylinders or the inner edges may slope inwardly in a direction away from the inlet. The blades may be secured in any suitable manner as for instance by securing flanges thereof, and where the baffling members are used in conjunction with guide vanes, the latter may in like manner be secured by the medium of flanges to the fan blades or vanes, and may extend from one blade to another and be connected to both blades, or may be secured to and carried by only one blade to extend partially across the space between said blade and the next blade. Or the guide vanes may be provided in the form of projections or ridges, stamped, pressed or cast in one with the blades or vanes. The fan blades or vanes are advantageously secured at the rear to a disk $c$ which is pivoted or centrally mounted to rotate and at the front or suction inlet extremity the fan blades or vanes are secured to an annulus $d$ having an annular flange $d^1$ which projects into a similar annular flange $e$ provided upon the stationary rotor casing $f$, thereby counteracting any back-rush of air from the rotor chamber to the suction eye $b$. According to another arrangement for this purpose a channel ring $j$ may be provided upon the front rotor annulus and a similar channel ring $j^1$ provided upon the stationary rotor casing, the side web of one channel projecting into the interior of the other channel, by which the same object is attained possibly in a still more effective manner, while offering no difficulties of construction or friction in the working of the appliance.

What I claim as my invention and desire to secure by Letters Patent is:—

1. In a centrifugal fan or pump, the combination with a casing having an axially disposed inlet and a circumferential outlet, and a rotor in said casing having blades disposed radially with respect to the axis of the rotor and extending parallel to said axis, said blades having a plurality of abutment portions facing the axially inflowing air and successively extending laterally of that abutment nearest said inlet for gradually and cumulatively resisting axial flow of the air, substantially as described.

2. In a centrifugal fan or pump, the combination with a casing having an axially disposed inlet and a circumferential outlet, a rotor in said casing having fan blades disposed radially with respect to the axis of said rotor and extending parallel to said axis, said blades having a plurality of plane surface portions disposed in parallel planes with respect to each other and successively offset laterally with respect to each other from that surface portion nearest the inlet, said plane surface portions having connecting webs forming air abutments and facing the axially inflowing air, substantially as described.

3. In a fan or pump, the combination with a casing having an axial intake and a circumferential outlet, and a rotor in said casing having fan blades disposed side by side and having unrestricted free spaces between adjacent blades extending throughout the working faces of the blades, said blades having offset portions on their working faces arranged to face the inflowing air, said offset portions extending successively laterally of each other from that abutment nearest the intake thereby gradually and cumulatively resisting axial flow of the air, substantially as described.

4. In a fan or pump, the combination with a casing having an axial inlet and a circumferential outlet, and a rotor in said casing having fan blades provided with a plurality of plane surface portions disposed in parallel planes with respect to each other and successively offset laterally with respect to each other from that surface portion nearest the inlet, said plane surface portions having connecting webs forming air abutments facing the axially inflowing air and gradually and cumulatively arresting axial flow of the air, substantially as described.

5. In a fan or pump, the combination with a casing having an axial intake and a circumferential outlet, and a rotor in said casing having fan blades of gradual increasing radial width from the intake rearwardly, said blades having offset portions successively extending laterally from that offset portion nearest the intake and successively increasing in area from that offset portion nearest the intake for gradually and cumulatively resisting the axial inflow of air, substantially as described.

6. In a fan or pump, the combination with a casing having an axial intake and a circumferential outlet, and a rotor in said casing having fan blades provided with offset portions successively extending laterally from that offset portion nearest the intake and successively increasing in area from that offset portion nearest the intake for gradually and cumulatively resisting the axial flow of air, substantially as described.

7. In a fan or pump, the combination of a casing having an axial intake and circumferential outlet, and a rotor in said casing having fan blades provided with air resisting portions disposed laterally of each other successively from that portion nearest the intake and successively increasing in area and projecting beyond the fan blades successively from that portion nearest the intake whereby the axially inflowing air is gradually and cumulatively interrupted, substantially as described.

8. In a fan or pump, the combination with a casing having an axial intake and a circumferential outlet, and a rotor in said casing having air resisting portions facing the axially flowing air and fan blades, said air resisting portions extending laterally of each other from that portion nearest the intake for gradually and cumulatively resisting the axial inflow of air, substantially as described.

9. In a centrifugal fan or pump, the combination with a casing having an axially disposed inlet and a circumferential outlet, a rotor in said casing having fan blades disposed radially with respect to the axis of said rotor and extending substantially parallel to said axis, said blades having a plurality of plane surface portions disposed in parallel planes with respect to each other and offset laterally with respect to each other from that surface portion nearest the inlet, the plane surface portions of the blades having a connecting web forming an air abutment facing the axial inflow of air, substantially as described.

In witness whereof I have hereunto set my hand in the presence of two witnesses.

OLAF BERG JACOBSEN.

Witnesses:
 ARTHUR H. BROWN,
 HOLLIS BROWN.